(12) United States Patent
Hung

(10) Patent No.: US 8,711,971 B2
(45) Date of Patent: Apr. 29, 2014

(54) MULTIPLE INPUT MULTIPLE OUTPUT TRANSCEIVER

(71) Applicant: Hon Hai Precision Industry Co., Ltd., New Taipei (TW)

(72) Inventor: Liang-Hsien Hung, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/864,287

(22) Filed: Apr. 17, 2013

(65) Prior Publication Data

US 2013/0336415 A1 Dec. 19, 2013

(30) Foreign Application Priority Data

Jun. 18, 2012 (TW) .............................. 101121667 A

(51) Int. Cl.
*H04B 7/02* (2006.01)
*H04L 1/02* (2006.01)

(52) U.S. Cl.
USPC ........... 375/267; 375/219; 375/295; 375/297; 370/277; 370/310; 370/339; 455/73; 455/78; 455/269; 455/571

(58) Field of Classification Search
CPC ............. H03F 3/60; H03F 3/211; H03F 3/20; H03F 3/24; H03F 1/3247; H04I 1/0625; H04L 1/0618; H04B 1/40
USPC ........... 375/67, 259, 260, 262, 265, 299, 347, 375/219, 297; 370/277, 310, 339; 455/571, 455/78, 269, 83
See application file for complete search history.

(56) References Cited

U.S. PATENT DOCUMENTS

| | | | | |
|---|---|---|---|---|
| 7,738,539 | B2 * | 6/2010 | Tudosoiu et al. | 375/219 |
| 8,417,286 | B2 * | 4/2013 | Gorbachov et al. | 455/553.1 |
| 2008/0130786 | A1 * | 6/2008 | Tudosoiu et al. | 375/297 |
| 2008/0166980 | A1 * | 7/2008 | Fukamachi et al. | 455/83 |
| 2008/0279262 | A1 * | 11/2008 | Shanjani | 375/219 |
| 2010/0091752 | A1 * | 4/2010 | Kemmochi et al. | 370/339 |
| 2010/0157860 | A1 * | 6/2010 | Hagiwara et al. | 370/310 |
| 2010/0166098 | A1 * | 7/2010 | Luz et al. | 375/267 |
| 2011/0053545 | A1 * | 3/2011 | Li et al. | 455/269 |
| 2011/0096766 | A1 * | 4/2011 | Tudosoiu et al. | 370/342 |
| 2012/0009886 | A1 * | 1/2012 | Poulin | 455/78 |
| 2012/0281597 | A1 * | 11/2012 | Khlat et al. | 370/277 |
| 2012/0287978 | A1 * | 11/2012 | O'Keeffe et al. | 375/222 |
| 2012/0306716 | A1 * | 12/2012 | Satake et al. | 343/841 |

\* cited by examiner

*Primary Examiner* — Daniel Washburn
*Assistant Examiner* — Amneet Singh
(74) *Attorney, Agent, or Firm* — Novak Druce Connolly Bove + Quigg LLP

(57) ABSTRACT

An exemplary MIMO transceiver includes a first transmitting channel and a second transmitting channel. The first transmitting channel includes a first power amplifier and a first transmission line which are connected together in series. The second transmitting channel includes a second power amplifier. A common terminal of a first single pole double throw (SPDT) switch is connected to the second power amplifier. A first terminal of the first SPDT switch is connected to the first power amplifier through a second transmission line. A common terminal of a second SPDT switch is connected to the second power amplifier. A first terminal of second SPDT switch is connected to the first power amplifier through a third transmission line. A second terminal of the second SPDT switch is connected to a second antenna. The first power amplifier, the second transmission line, and the third transmission line cooperatively act as a balance power amplifier.

17 Claims, 2 Drawing Sheets

MULTIPLE INPUT MULTIPLE OUTPUT TRANSCEIVER

BACKGROUND

1. Technical Field

The disclosure relates to multiple input multiple output (MIMO) transceivers.

2. Description of Related Art

Wireless devices are popular nowadays. A transmission distance of radio frequency (RF) signals transmitted by wireless devices is very important. The gain of a wireless device may be increased by changing the shape of an antenna of the wireless device, so as to increase the transmission distance of RF signals transmitted by the antenna. However, antennas of wireless devices still have a certain transmission distance limit, which may prevent longer-range applications for the wireless device.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the views.

DETAILED DESCRIPTION

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references can mean "at least one."

Figure 1:
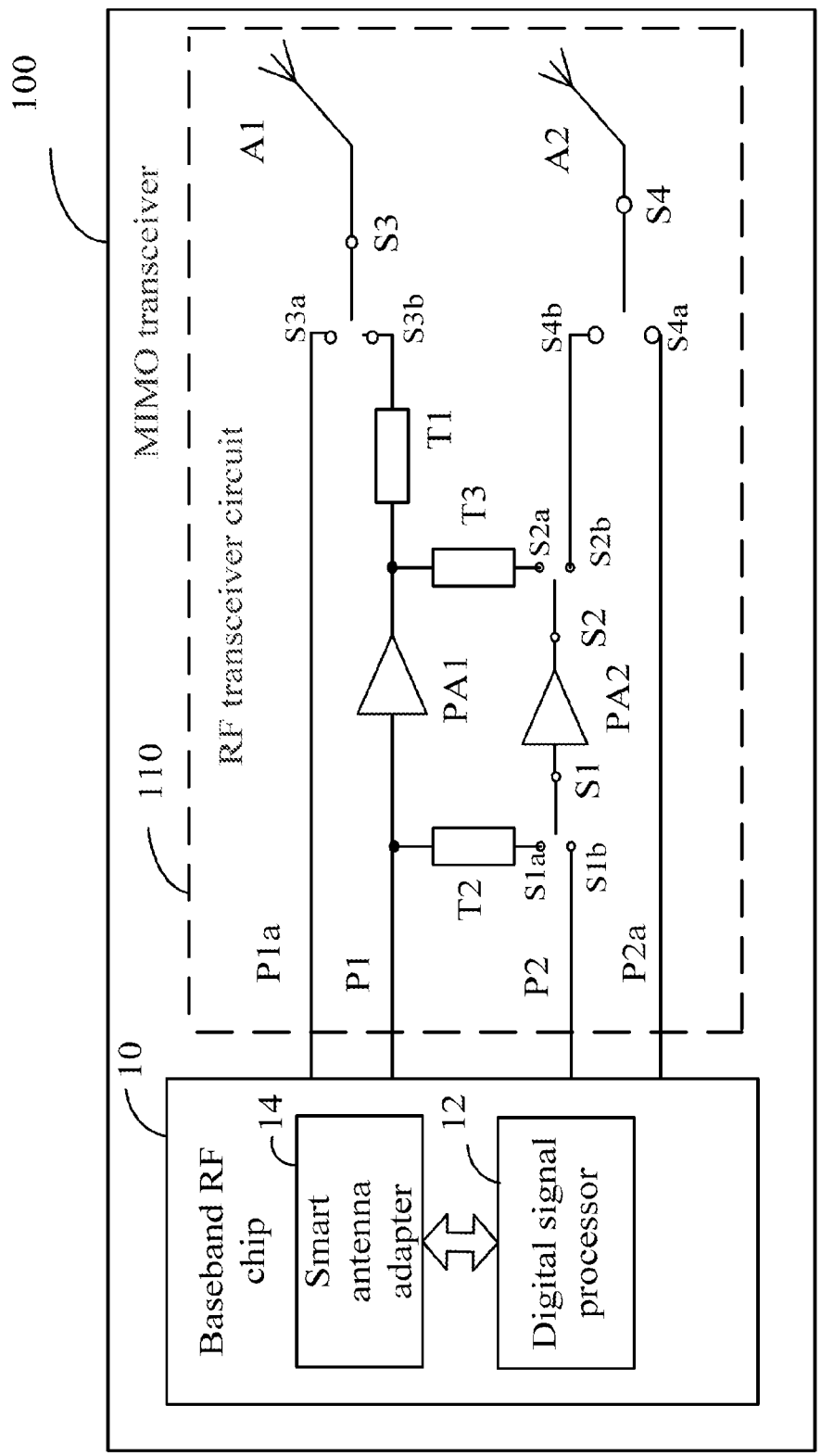
FIG. 1 is a circuit diagram of one embodiment of a multiple input multiple output transceiver.

FIG. 1 is a circuit diagram of one embodiment of a multiple input multiple output (MIMO) transceiver 100. In one embodiment, the MIMO transceiver 100 comprises a baseband radio frequency (RF) chip 10 and an RF transceiver circuit 110. The RE transceiver circuit 110 comprises a first antenna A1, a second antenna A2, a first receiving channel P1a, a second receiving channel P2a, first transmitting channel P1, a second transmitting channel P2, a first single pole double throw (SPDT) switch S1, and a second SPDT switch S2.

The first antenna A1 and the second antenna A2 receive and transmit RF signals. The baseband RF chip 10 is connected to the first antenna A1 through the first transmitting channel P1 and the first receiving channel P1a, and is also connected to the second antenna A2 through the second transmitting channel P2 and the second receiving channel P2a.

The RF transceiver circuit 110 further comprises a first sequence switch S3 and a second sequence switch S4. In one embodiment, a common terminal of the first sequence switch S3 is connected to the first antenna A1, a first terminal S3a of the first sequence switch S3 is connected to the baseband RF chip 10 through the first receiving channel P1a, and a second terminal S3b of the first sequence switch S3 is connected to the baseband RF chip 10 through the first transmitting channel P1. In one embodiment, a common terminal of the second sequence switch S4 is connected to the second antenna A2, a first terminal S4a of the second sequence switch S4 is connected to the baseband RF chip 10 through the second receiving channel P2a, and a second terminal S4b of the second sequence switch S4 is connected to the baseband RF chip 10 through the second transmitting channel P2.

Through the first sequence switch S3, the first antenna A1 may connect to the first transmitting channel P1 or to the first receiving channel P1a. Through the second sequence switch S4, the second antenna A2 may connect to the second transmitting channel P2 or to the second receiving channel P2a.

In one embodiment, the first antenna A1 receives the RF signals and transmits the RF signals by way of the first sequence switch S3 repeatedly switching between the first transmitting channel P1 and the first receiving channel P1a. The second antenna A2 receives the RF signals and transmits the RF signals by way of the second sequence switch S4 repeatedly switching between the second transmitting channel P2 and the second receiving channel P2a. In response to the first antenna A1 and the second antenna A2 receiving the RF signals, the common terminals of the first and second sequence switches S3 and S4 are connected to the first terminal S3a of the first sequence switch S3 and the first terminal S4a of the second sequence switch S4, respectively. In response to the first antenna A1 and the second antenna A2 transmitting RF signals, the common terminals of the first and second sequence switches S3 and S4 are connected to the second terminal S3b of the first sequence switch S3 and the second terminal S4b of the second sequence switch S4, respectively.

In one embodiment, the first transmitting channel P1 includes a first power amplifier PA1 and a first transmission line T1 connected together in series, and the second transmitting channel P2 includes a second power amplifier PA2. An output of the first power amplifier PA1 is connected to a third transmission line T3 and the first transmission line T1, and an input of the first power amplifier PA1 is connected to a second transmission line T2 and the baseband RF chip 10. An input of the second power amplifier PA2 is connected to a common terminal of the first SPDT switch S1, and an output of the second power amplifier PA2 is connected to a common terminal of the second SPDT switch S2.

A first terminal S1a of the first SPDT switch S1 is connected to the second transmission line T2, and a second terminal S1b of the first SPDT switch S1 is connected to the baseband RF chip 10. The first SPDT switch S1 may connect to the second transmission line T2 or to the baseband RF chip 10. A first terminal S2a of the second SPDT switch S2 is connected to the third transmission line T3, and a second terminal S2b of the second SPDT switch S2 is connected to the second antenna A2 through the second sequence switch S4. The second SPDT switch S2 may connect to the third transmission line T3 or to the second antenna A2 through the second sequence switch S4.

In one embodiment, where the first antenna A1 and the second antenna A2 are transmitting RF signals, that is, with the first sequence switch S3 being connected to the first transmitting channel P1, the second sequence switch S4 being connected to the second transmitting channel P2, and the common terminal of the first SPDT switch S1 being connected to the first terminal S1a of the first SPDT switch S1 and the common terminal of the second SPDT switch S2 being connected to the first terminal S2a of the second SPDT switch S2, then the first power amplifier PA1, the second power amplifier PA2, the second transmission line T2, and the third transmission line T3 cooperatively act as a balance power amplifier which can increase the transmission power gain. The transmission power gain is increased by as much as 3 db (decibels) by the balance power amplifier.

Where the common terminal of the first SPDT switch S1 is connected to the second terminal S1b of the first SPDT switch S1 and the common terminal of the second SPDT switch S2 is connected to the second terminal S2b of the second SPDT switch S2, then the first transmitting channel P1, the second transmitting channel P2, the first receiving channel P1a, and the second receiving channel P2a cooperatively function as a multiple input multiple output device.

In one embodiment, the baseband RF chip 10 comprises a digital signal processor (DSP) 12 and a smart antenna adapter 14. The DSP 12 is connected to the smart antenna adapter 14, and the smart antenna adapter 14 calculates an optimal phase with the best radiation performance between the first antenna A1 and the second antenna A2. The DSP 12 adjusts the phase between the first antenna A1 and the second antenna A2 according to the optimal phase, to keep the phase delay between the first antenna A1 and the second antenna A2 at a fixed value, and to generate a beamforming signal to increase the receiving gain of the first antenna A1 and of the second antenna A2. For example, the fixed value may be $0.7\lambda$, where $\lambda$ is the wavelength of the RF signal transmitted or received by the first and second antennas A1, A2.

In one embodiment, where the first antenna A1 and the second antenna A2 are receiving RF signals, that is, with the first sequence switch S3 being connected to the first receiving channel P1a and the second sequence switch S4 being connected to the second receiving channel P2a, then the power gain of the radio wave reception of the first antenna A1 and of the second antenna A2 is increased, by as much as 3 db, and the MIMO transceiver 100 achieves the multiple input function.

Where the first SPDT switch S1 is connected to the baseband RF chip 10 through the second transmission line T2 and the second SPDT switch S2 is connected to the output of the first power amplifier PA1 through the third transmission line T3, the MIMO transceiver 100 calculates an increased transmission distance of the RF signal being transmitted according to the increased gain in receiving and transmission of the first antenna A1 and of the second antenna A2. In one embodiment, an increase of fifty percent of the transmission distance of the RF signal can be calculated according to the 3 db power gain generated in the radio wave reception by the first antenna A1 and by the second antenna A2, and according to the same percentage power gain generated by the beamforming signals transmitted by the first antenna A1 and by the second antenna A2.

Where the first SPDT switch S1 is connected to the baseband RF chip 10 through the second terminal S1a of the first SPDT switch S1 and the second SPDT switch S2 is connected to the second antenna A2 through the second terminal S2a of the second SPDT switch S2, the MIMO transceiver 100 functions as an RF signal multiple input multiple output device according to the manner of the first antenna A1 and the second antenna A2 receiving and transmitting RF signals. In one embodiment, the MIMO transceiver 100 transforms between increasing the transmission distance of the RF signals and increasing the throughput by the MIMO transceiver 100, by adjusting the first SPDT switch S1 and the second SPDT switch S2.

Figure 2:
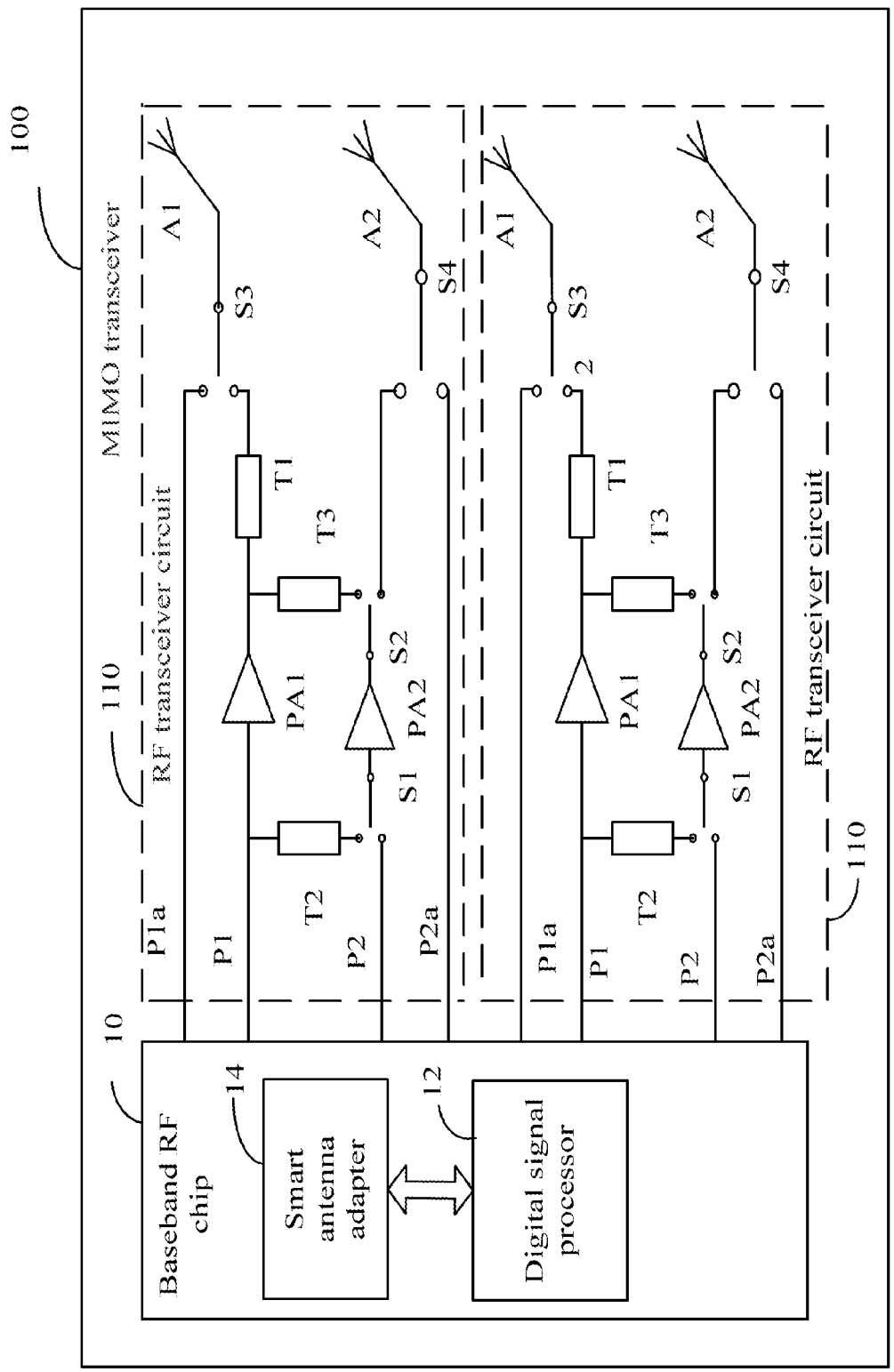
FIG. 2 is a circuit diagram of another embodiment of a multiple input multiple output transceiver.

FIG. 2 is a circuit diagram of another embodiment of the MIMO transceiver 100. In this embodiment, the MIMO transceiver 100 includes a plurality of the RF transceiver circuits 110. In the illustrated embodiment, there are two RF transceiver circuits 110.

In one embodiment, the MIMO transceiver 100 acts as a balance power amplifier, and increases the reception gain and the transmission gain of the first antennas A1 and of the second antennas A2, according to the MIMO transceiver 100 adjusting the first SPDT switches S1 and the second SPDT switches S2. Thereby, the transmission distance of the RF signals is increased. The MIMO transceiver 100 can adjust the first SPDT switches S1 and the second SPDT switches S2 according to different needs, to transform between increasing the transmission distance of the RF signals and increasing the throughput by the MIMO transceiver 100.

The foregoing disclosure of various embodiments has been presented for the purposes of illustration. It is not intended to be exhaustive or to limit the claimed invention to the precise forms disclosed. Many variations and modifications of the embodiments described herein will be apparent to one of ordinary skill in the art in the light of the above disclosure. The scope of the invention is to be defined only by the claims appended hereto and their equivalents.

What is claimed is:

1. A multiple input multiple output (MIMO) transceiver comprising:
    a baseband radio frequency (RF) chip for conducting RF signals; and
    an RF transceiver circuit, comprising:
        a first antenna and a second antenna, the first and second antennas receiving and transmitting the RF signals;
        a first receiving channel connected between the first antenna and the baseband RF chip;
        a second receiving channel connected between the second antenna and the baseband RF chip;
        a first transmitting channel connected between the baseband RF chip and the first antenna, and comprising a first power amplifier and a first transmission line which are connected together in series;
        a second transmitting channel connected between the baseband RF chip and the second antenna, and comprising a second power amplifier;
        a first single pole double throw (SPDT) switch, wherein a common terminal of the first SPDT switch is connected to an input of the second power amplifier, a first terminal of the first SPDT switch is connected to an input of the first power amplifier through a second transmission line, and a second terminal of the first SPDT switch is connected to the baseband RF chip; and
        a second SPDT switch, wherein a common terminal of the second SPDT switch is connected to an output of the second power amplifier, a first terminal of the second SPDT switch is connected to an output of the first power amplifier through a third transmission line, and a second terminal of the second SPDT switch is connected to the second antenna;
        wherein in response to the common terminal of the first SPDT switch being connected to the first terminal of the first SPDT switch and the common terminal of the second SPDT switch being connected to the first terminal of the second SPDT switch, the first power amplifier, the second power amplifier, the second transmission line, and the third transmission line cooperatively act as a balance power amplifier.

2. The MIMO transceiver of claim 1, wherein in response to the common terminal of the first SPDT switch being connected to the second terminal of the first SPDT switch and the common terminal of the second SPDT switch being connected to the second terminal of the second SPDT switch, the first transmitting channel, the second transmitting channel, the first receiving channel, and the second receiving channel cooperatively function as a multiple input multiple output device.

3. The MIMO transceiver of claim 2, wherein the first receiving channel and the second receiving channel transmit a beamforming signal collectively formed by the first antenna and the second antenna.

4. The MIMO transceiver of claim 3, wherein the baseband RF chip comprises:
   a smart antenna adapter, calculating an optimal phase with the best radiation performance between the first antenna and the second antenna; and
   a digital signal processor, adjusting the phase between the first antenna and the second antenna according to the optimal phase and thus keeping the phase delay between the first antenna and the second antenna at a fixed value, thereby forming the beamforming signal and increasing a receiving gain of the first antenna and of the second antenna.

5. The MIMO transceiver of claim 4, wherein the fixed value is $0.7\lambda$, and $\lambda$ is the wavelength of the RF signals transmitted or received by the first and the second antennas.

6. The MIMO transceiver of claim 1, further comprising at least another RF transceiver circuit.

7. The MIMO transceiver of claim 1, wherein the RF transceiver circuit further comprises:
   a first sequence switch, wherein a common terminal of the first sequence switch is connected to the first antenna, a first terminal of the first sequence switch is connected to the baseband RF chip through the first receiving channel, and a second terminal of the first sequence switch is connected to the baseband RF chip through the first transmitting channel; and
   a second sequence switch, wherein a common terminal of the second sequence switch is connected to the second antenna, a first terminal of the second sequence switch is connected to the baseband RF chip through the second receiving channel, and a second terminal of the second sequence switch is connected to the baseband RF chip through the second transmitting channel.

8. The MIMO transceiver of claim 7, wherein in response to the first antenna and the second antenna receiving the RF signals, the common terminal of the first sequence switch is connected to the first terminal of the first sequence switch, and the common terminal of the second sequence switch is connected to the first terminal of the second sequence switch.

9. The MIMO transceiver of claim 7, wherein in response to the first antenna and the second antenna receiving the RF signals, the common terminal of the first sequence switch is connected to the second terminal of the first sequence switch, and the common terminal of the second sequence switch is connected to the second terminal of the second sequence switch.

10. A multiple input multiple output (MIMO) transceiver comprising:
    a baseband radio frequency (RF) chip for conducting RF signals; and
    a plurality of RF transceiver circuits, each of the RF transceiver circuits comprising:
       a first antenna and a second antenna, the first and second antennas receiving and transmitting the RF signals;
       a first receiving channel connected between the first antenna and the baseband RF chip;
       a second receiving channel connected between the second antenna and the baseband RF chip;
       a first transmitting channel connected between the baseband RF chip and the first antenna, and comprising a first power amplifier and a first transmission line which are connected together in series;
       a second transmitting channel connected between the baseband RF chip and the second antenna, and comprising a second power amplifier;
       a first single pole double throw (SPDT) switch, wherein a common terminal of the first SPDT switch is connected to an input of the second power amplifier, a first terminal of the first SPDT switch is connected to an input of the first power amplifier through a second transmission line, and a second terminal of the first SPDT switch is connected to the baseband RF chip; and
       a second SPDT switch, wherein a common terminal of the second SPDT switch is connected to an output of the second power amplifier, a first terminal of the second SPDT switch is connected to an output of the first power amplifier through a third transmission line, and a second terminal of the second SPDT switch is connected to the second antenna;
    wherein in response to the common terminal of the first SPDT switch being connected to the first terminal of the first SPDT switch and the common terminal of the second SPDT switch being connected to the first terminal of the second SPDT switch, the first power amplifier, the second power amplifier, the second transmission line, and the third transmission line cooperatively act as a balance power amplifier.

11. The MIMO transceiver of claim 10, wherein in response to the common terminal of the first SPDT switch being connected to the second terminal of the first SPDT switch and the common terminal of the second SPDT switch being connected to the second terminal of the second SPDT switch, the first transmitting channel, the second transmitting channel, the first receiving channel, and the second receiving channel cooperatively function as multiple input multiple output.

12. The MIMO transceiver of claim 11, wherein the first receiving channel and the second receiving channel transmit a beamforming signal collectively formed by the first antenna and the second antenna.

13. The MIMO transceiver of claim 12, wherein the baseband RF chip comprises:
    a smart antenna adapter, calculating an optimal phase with the best radiation performance between the first antenna and the second antenna; and
    a digital signal processor, adjusting the phase between the first antenna and the second antenna according to the optimal phase, to keep the phase delay between the first antenna and the second antenna at a fixed value, to form the beamforming to increase a receiving gain of the first antenna and the second antenna.

14. The MIMO transceiver of claim 13, wherein the fixed value is $0.7\lambda$, and $\lambda$ is the wavelength of the RF signals transmitted or received by the first and the second antenna.

15. The MIMO transceiver of claim 10, wherein the RF transceiver circuit further comprises:
    a first sequence switch, wherein a common terminal of the first sequence switch is connected to the first antenna, a first terminal of the first sequence switch is connected to the baseband RF chip through the first receiving channel, and a second terminal of the first sequence switch is connected to the baseband RF chip through the first transmitting channel; and
    a second sequence switch, wherein a common terminal of the second sequence switch is connected to the second antenna, a first terminal of the second sequence switch is connected to the baseband RF chip through the second receiving channel, and a second terminal of the second sequence switch is connected to the baseband RF chip through the second transmitting channel.

16. The MIMO transceiver of claim 15, wherein in response to the first antenna and the second antenna receiving the RF signals, the common terminal of the first sequence switch is connected to the first terminal of the first sequence switch, and the common terminal of the second sequence switch is connected to the first terminal of the second sequence switch.

17. The MIMO transceiver of claim 15, wherein in response to the first antenna and the second antenna receiving the RF signals, the common terminal of the first sequence switch is connected to the second terminal of the first sequence switch, and the common terminal of the second sequence switch is connected to the second terminal of the second sequence switch.

* * * * *